US008924600B2

(12) United States Patent
Alley et al.

(10) Patent No.: US 8,924,600 B2
(45) Date of Patent: Dec. 30, 2014

(54) PROGRAMMABLE UNIVERSAL IO INTERFACE

(71) Applicant: General Electric Company, Schenectady, NY (US)

(72) Inventors: Daniel Milton Alley, Salem, VA (US); Naresh Kesavan Rao, Niskayuna, NY (US); Alan Paul Mathason, Philadelphia, PA (US); Feng Chen, Niskayuna, NY (US); Stephen Emerson Douthit, Charlottesville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/829,905

(22) Filed: Mar. 14, 2013

(65) Prior Publication Data

US 2014/0281048 A1  Sep. 18, 2014

(51) Int. Cl.
  *G06F 3/06* (2006.01)
  *G05B 19/05* (2006.01)
  *G06F 13/38* (2006.01)
  *G06F 13/00* (2006.01)

(52) U.S. Cl.
  CPC ............ *G05B 19/054* (2013.01); *G06F 13/385* (2013.01)
  USPC .......................... 710/12; 710/2; 710/5; 710/8

(58) Field of Classification Search
  None
  See application file for complete search history.

(56) References Cited

U.S. PATENT DOCUMENTS

| 7,802,020 | B2 | 9/2010 | Wong |
| 7,881,323 | B2 | 2/2011 | Wong et al. |
| 2011/0301772 | A1* | 12/2011 | Zuercher et al. ............... 700/293 |
| 2013/0274975 | A1* | 10/2013 | Gregg et al. ..................... 701/22 |

OTHER PUBLICATIONS

U.S. Appl. No. 13/779,666, filed Feb. 27, 2013, Alley.

* cited by examiner

*Primary Examiner* — Scott Sun
(74) *Attorney, Agent, or Firm* — Fletcher Yoder, P.C.

(57) ABSTRACT

A system is provided that includes a controller that is configured to enable communication between one or more sensors and a processor. The controller includes a plurality of input-output (IO) ports each configured to couple to the one or more sensors. Moreover, each of the IO ports is configured to couple to a plurality of sensor types such that each IO port is configured to couple more than one sensor type. The controller also includes an interface configured to receive a selection of a selected mode from a plurality of modes each corresponding to a sensor type. Furthermore, the controller includes a switch block having a plurality of switches each configured to toggle a connection in the switch block according to the selected mode.

20 Claims, 6 Drawing Sheets

PROGRAMMABLE UNIVERSAL IO INTERFACE

BACKGROUND

The subject matter disclosed herein relates to an input-output (IO) interface between a sensor and a processor in a sensor-controlled system.

In control systems, processors are often coupled to sensors to receive measurements regarding conditions internal to or external to an external device. Using these measurements, the processor controls the external device. In many situations, the number and/or type of sensors to be included in the control system are determined by the intended use of the control system. Traditionally, each control system is designed specifically for each intended use. In such control systems, the redesign costs for each implementation is more expensive than a control system that may be used in multiple settings. Accordingly control systems may be designated to be implemented with multiple terminals each dedicated for a connection to a specific sensor type. However, a control system with multiple dedicated terminals may waste connections because each connection type may not be used in each control system. Additionally, in such control systems, the ratio of sensor types may be inadequately proportioned. In other words, there may not be enough connections for one sensor type and too many connections for other sensor types.

BRIEF DESCRIPTION

Certain embodiments commensurate in scope with the disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a system includes a controller enables communication between one or more sensors and a processor. The controller includes a plurality of input-output ports (IO) ports configured to couple to the one or more sensors. Moreover, each of the IO ports couples to a first sensor of the one or more sensors and a second sensor of the one or more sensors. The first sensor comprises a first sensor type of the plurality of sensor types, and the second sensor comprises a second sensor type of the plurality of sensor types. Furthermore the first sensor type is different than the second sensor type. The controller also includes an interface configured to receive data indicative of a selected mode from multiple modes each corresponding to a sensor type. Additionally, the controller includes a switch block that includes multiple switches. The interface toggles switches in the switch block to couple the processor to the sensor according to the selected mode.

In a second embodiment, an integrated circuit provides signal conversion from one or more sensors to a processor. The integrated circuit includes an input-output port (IO) port couples to a first sensor and a second sensor, wherein the first sensor couples to the IO port using a first communication method and the second sensor couples to the IO port using a second communication method. The integrated circuit also includes an interface that receives data indicative of the first communication method or the second communication method. Furthermore, the integrated circuit includes a switch block that includes multiple switches. Moreover, the interface toggles a first subset of the plurality of switches upon the selection of the first communication method and toggles a second subset of the plurality of switches upon selection of the second communication method. Furthermore, the first subset is configured to couple the first sensor to the processor, and the second subset is configured to couple the second sensor to the processor.

In a third embodiment, a method for communicating between a sensor and a processor includes receiving data indicative of a sensor type via an interface. The method also includes toggling a first subset of multiple switches corresponding to a first sensor type when data indicative of a first sensor type is received. The method also includes toggling a second subset of the plurality of switches corresponding to a second sensor type when data indicative of the second sensor type is received. Additionally, the method includes receiving sensor signals from the first or second sensor via an input-output (IO) port at a first voltage. Furthermore, the method includes sending processor signals to the processor via a channel at a second voltage.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
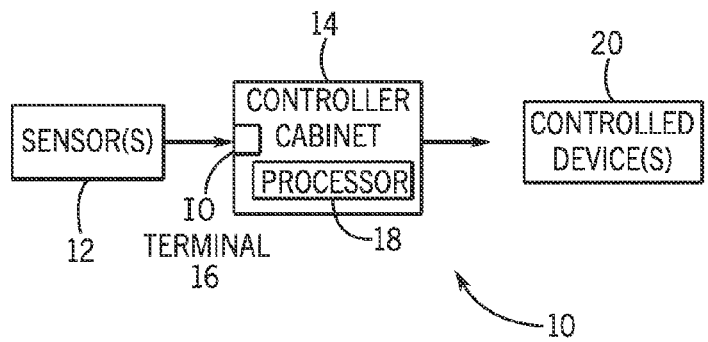
FIG. 1 illustrates a block diagram view of an embodiment of a sensor-controlled system having a sensor and a processor.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements.

The terms "comprising," "including," and "having" are intended to be inclusive and mean that there may be additional elements other than the listed elements.

Various embodiments of the present disclosure include a universal IO port in a sensor-controlled system. The sensor-controlled system includes one or more sensors that may be connected to a controller cabinet through one or more IO ports. The one or more sensors may include a variety of sensor types using one or more of communication methods. For example, some embodiments of the sensors may include external/internal wetted contact inputs; milliamp inputs; HART inputs; resistor temperature detectors (RTDs) having two, three, or four wire connections; thermocouples, voltage inputs; voltage outputs; pulse inputs; and/or other suitable sensor types. In certain embodiments, some sensors may communicate using one or more methods of communication. For example, some sensors may alternate (e.g., based on user selection) between HART protocols, other modulated communication method, various currents and/or voltages, or some other suitable communication method. A universal IO terminal allows a sensor to alternate between communication methods with the controller cabinet without being required to move the sensor between IO terminals. By including a universal IO terminal, a sensor-controlled system may be more efficiently designed and/or implemented than specially designed sensor-controlled systems having dedicated IO terminals. Additionally, by providing universal IO terminals that may be used with a variety of sensor types, the sensor-controlled system may incorporate an additional sensor of any of multiple sensor types as long as the appropriate number of IO terminals are available for the sensor. By including versatile IO terminals, the sensor-controlled system may reduce the number of wasted terminals that may remain unused in certain applications by allowing any IO terminal to be used to connect any desired sensor types. In other words, one controller cabinet may be used in multiple sensor-controlled systems, thereby reducing productions costs and/or design costs by reusing the controller cabinet design in multiple systems without including wasted IO terminals that may be unused in some sensor-controlled systems.

FIG. 1 illustrates an embodiment of a sensor-controlled system 10. In some embodiments, the sensor-controlled system 10 may be a power management system in a power plant or other suitable systems. In certain embodiments, the sensor-controlled system 10 includes one or more sensors 12 that couple to a controller cabinet 14 through one or more IO terminals 16. In certain embodiments, the one or more sensors 12 may detect temperatures (e.g., thermocouples, resistor temperature detectors (RTDs)), electrical properties (e.g., current, voltage) of certain signals, or other suitable properties and may transmit sensed information to a respective 10 terminal 16 in one of a variety of formats. For example, various embodiments of the terminals 16 may receive information from various types of sensors 12 that send information using various voltages, such as 2.5 to 5V, −10V to 10V, 30 mV to 10V, −100 mV to 100 mV, or other suitable voltages. Additionally, or alternatively, some embodiments of the IO terminals 16 may receive signals from the sensors 12 using a variety of currents such as 4-20 mA, 10 mA, or other suitable currents. Additionally, certain embodiments of the sensors 12 may transmit using a highway addressable remote transducer (HART) protocol or other similar protocols.

In some embodiments, the controller cabinet 14 may be housed in a single physical enclosure (e.g., a personal computer, server, or other suitable controller system) or may include multiple enclosures (e.g., distributed control system). In each of the various embodiments, the one or more IO terminals 16 provide a connection between the one or more sensors 12 and the controller cabinet 14. As discussed in detail below, the one or more IO terminals 16 provide a link between the sensor 16 and a processor 18. In some embodiments, the processor 18 may include a microcontroller, a microprocessor, a programmable logic controller (PLC), or another suitable processor. Accordingly, through the one or more IO terminals 16, the processor 18 may receive signals from the one or more sensors 12 that sense various measurements within the sensor-controlled system 10. Additionally, the one or more IO terminals 16 may be grouped in channels to receive sensed parameters from the one or more sensors 12 through more than 1 IO terminal. Furthermore, one or more of the IO terminals 16 in a channel may be used to return information to one or more sensors 12. For example, in some embodiments, a sensor 12 (e.g., RTD) may be connected to the controller cabinet 14 through 1, 2, 3, 4, or more IO terminals 16. For example, in certain embodiments, one channel may encompass 2 IO terminals 16, but other embodiments may include channels encompassing 3, 4, or more IO terminals 16. Moreover, in some embodiments each sensor 12 may connect to a single channel, but other embodiments may include sensors 12 that span 2 or more channels.

In various embodiments, once the processor 18 has received a sensed parameter (e.g., temperature) from the one or more sensors 12, the processor 18 may use this sensed parameter to control one or more controlled devices 20 and/or select a sensor type for the connected sensor 12. Within the sensor-controlled system 10, the controlled devices 20 may include any device that depends upon or creates the measurements from the one or more sensors 12. For example, in certain embodiments, the controlled devices 20 may include one or more devices within a power plant (e.g., compressor, combustor, turbine, etc.).

Figure 2:
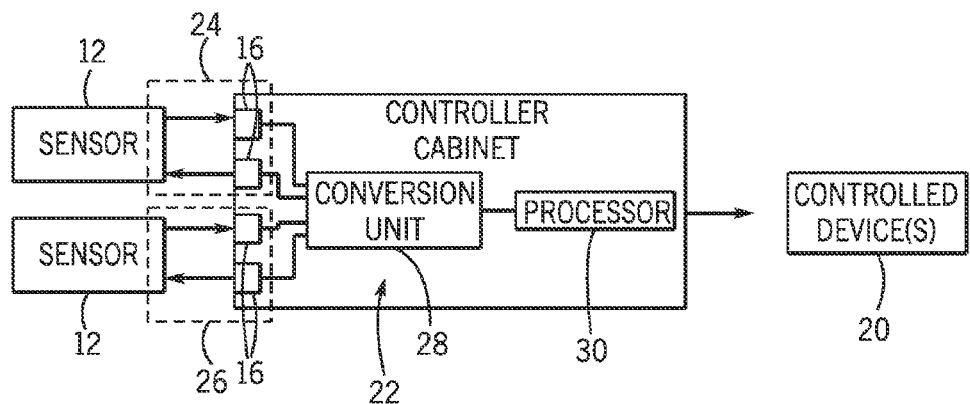
FIG. 2 illustrates a block diagram view of an embodiment of the sensor-controlled system of FIG. 1 with a conversion unit.

As can be appreciated, signals from the one or more sensors 12 may contain voltages and/or currents that the processor 18 may not be able to receive directly from the one or more sensors 12 without first converting those signals to a new voltage and/or current. Accordingly, FIG. 2 illustrates a sensor-controlled system 10 includes a sensor conversion system 22. In the illustrated embodiment, the sensor-controlled system 10 includes two sensors 12, but other embodiments may include 1, 3, 4, or more sensors. Additionally, the illustrated embodiment of the sensor-controlled system 10 includes a first channel 24 that couples the controller cabinet 14 to a respective sensor 12. The illustrated embodiment of the sensor-controlled system 10 also includes a second channel 26 that couples the controller cabinet 14 to a respective sensor 12. Although the illustrated embodiment of the first channel 24 and the second channel 26 each includes two IO terminals 16 each, certain embodiments of the sensor conversion system 22 include channels having 1, 3, 4, or more IO terminals 16. The illustrated embodiment of the sensor conversion system 22 also includes a conversion component 28 the converts the signals from the sensor(s) 12 to voltages and/or currents that are suitable for processing by the processor 18. As discussed in detail below, the conversion component 28 may receive inputs from one or more sensors 12 regardless of a sensor type of each respective sensor 12. The conversion component 28 then converts the signals from each of the sensors 12 regardless of sensor type to signals suitable for the processor 18 to process. For example, the sensors 12 may be any sensor type, such as sensors 12 that send 4-20 milliamp signals, thermocouples, RTDs, HART devices, or other suitable sensor types. In other words, the conversion component 28 (along with the IO terminals 16) provides a universal IO point that enables the use of various sensor types to connect to the controller cabinet 14 and the processor 18 without implementing dedicated IO terminals 16 for each sensor type. By increasing versatility of the IO terminals 16 in the controller cabinet 14, production and design costs of the controller cabinet 14 is reduced by providing a single controller cabinet 14 that may couple to various sensors 12 and/or sensor types, thereby enabling the controller cabinet 14 to be used in a variety of settings without redesigning the controller cabinet 14 for each intended use or wasting additional dedicated IO terminals 16.

In some embodiments, the conversion component 28 may include voltage and/or current conversion circuitry that may be implemented using application specific integrated circuits (ASICs) or other suitable circuitry. Additionally, in some embodiments, the conversion component 28 may include further processing circuitry that may perform additional manipulation on the sensed signals from the sensor(s) 12. For example certain embodiments of the conversion component 28 may include digital-to-analog converters (DAC) and/or analog-to-digital converters (ADC).

Figure 3:
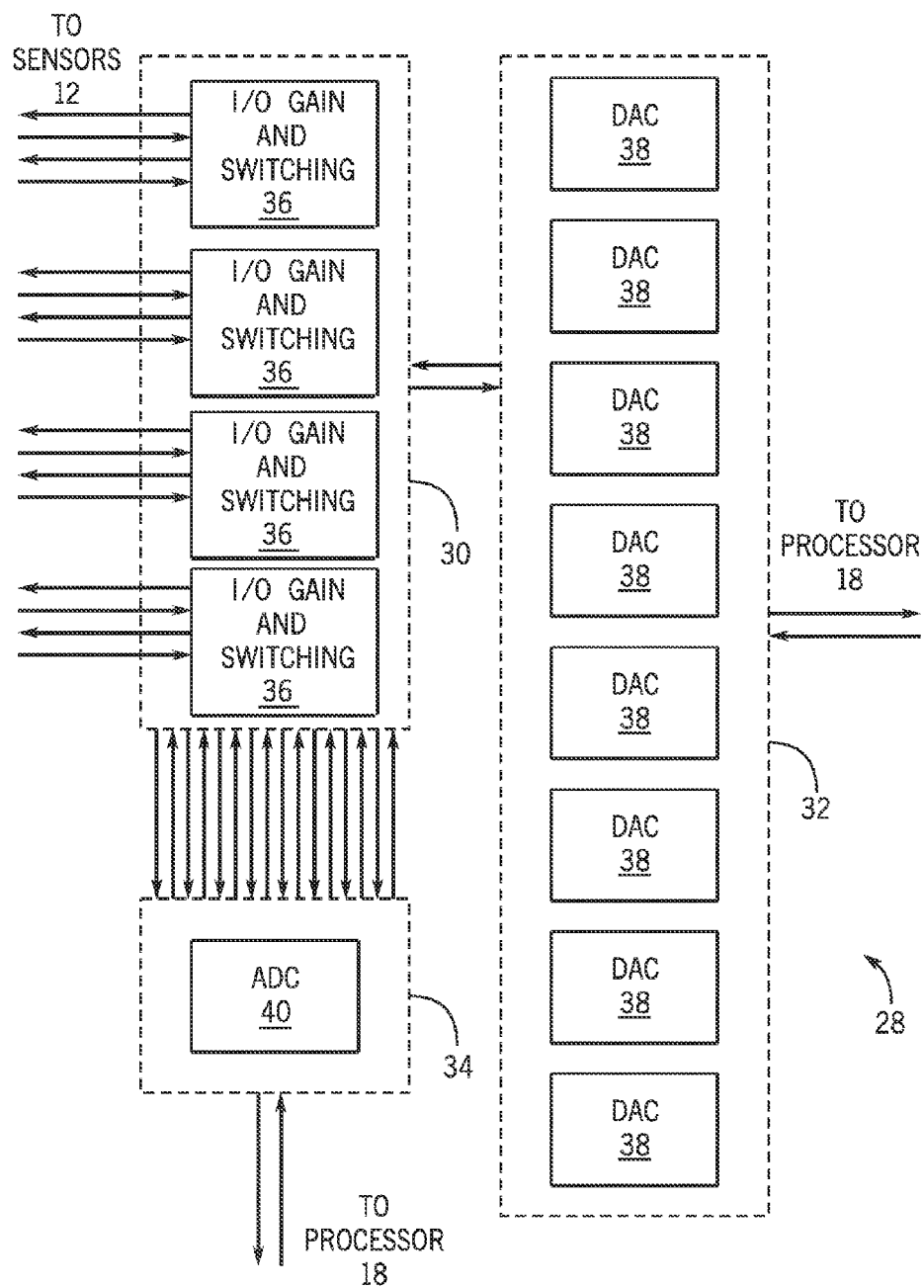
FIG. 3 illustrates a block diagram view of an embodiment of the conversion unit of FIG. 2 having I/O Gain and Switching.

FIG. 3 illustrates an embodiment of the conversion component 28 having a voltage/current block 30, a DAC block 32, and an ADC block 34. In certain embodiments, the conversion component 28 may be implemented using integrated circuits, individual electrical components, and/or a combination thereof. Although further discussion relates to implementing the conversion component 28 using ASICs, other embodiments may include conversion units 28 implemented on any suitable hardware implementation.

In certain embodiments, the voltage/current block 30 may include one or more I/O Gain and Switching units 36. For example, certain embodiments of the voltage/current block 30 may be implemented with four I/O Gain and Switching units 36 using ASICs. In other embodiments, the voltage/current block 30 may include 1, 2, 3, or more I/O Gain and Switching units 36. Additionally, in the illustrated embodiment, each I/O Gain and Switching unit 36 may include two channels each including two IO terminals 16 totaling four IO terminals 16 per I/O Gain and Switching unit 36. However various embodiments of the I/O Gain and Switching may include 1, 2, 3, 4, or more channels implemented across 1, 2, 3, 4, or more IO terminals 16. For example, certain embodiments of the I/O Gain and Switching 36 may include three channels each implemented on a respective IO terminal 16, and other embodiments may include three channels each implemented on three IO terminals 16 for a total of nine IO terminals 16.

The illustrated embodiment of the conversion component 28 also includes a DAC block 32 that includes multiple DAC units 38. The DAC units 38 are configured to convert digital signals to analog signals to and from the processor 18, external circuitry, and/or the voltage/current block 30. The DAC units 38 may be implemented using any suitable DAC method, such as one or more ASICs. Although the illustrated embodiment shows the DAC block 32 separate from the voltage/current block 30, certain embodiments of the conversion component 28 may include an ASIC that contains the voltage/current block 30, the DAC block 32, and/or an ADC block 34. Additionally, each DAC unit 38 may include one or more channels. In the illustrated embodiment, each DAC unit 38 includes one channel, but other embodiments of the DAC units 38 may include 2, 3, 4, or more channels. As illustrated, the number of DAC units 38 may be selected to match the number of channels include the voltage/current block 30, such that each channel in the voltage/current block 30 has a corresponding channel in the DAC block 32. In other words, if the voltage/current block 30 includes eight channels, the DAC block 32 should also include eight channels to provide digital-to-analog conversions for each channel. Thus, the illustrated embodiment of the DAC block 32 includes eight DAC units 38 each having a single channel to provide eight channels of digital-to-analog conversion for the voltage/current block 30.

The illustrated embodiment of the conversion component 28 further includes an ADC block 34 that includes one or more ADC units 40. Each ADC unit 40 is configured to convert analog signals to digital signals to and from the processor 18, external circuitry, and/or the voltage/current block 30. Moreover, each ADC unit 40 may be implemented using any suitable ADC method, such as an ASIC. Although the illustrated embodiment shows the ADC block 34 separate from the voltage/current block 30 and the DAC block 32, other embodiments of the conversion component 28 may one or more ASICs that contain the voltage/current block 30, the DAC block 32, and/or ADC block 34. Additionally, similar to the DAC block 32, the ADC block 34 may include any number of ADC units 40 that would provide a number of channels that matches the number of channels in the voltage/current block 30. For example, the ADC unit 40 in the illustrated embodiment includes 8 channels that each correspond to a respective one of the 8 channels in the voltage/current block 34.

Figure 4:
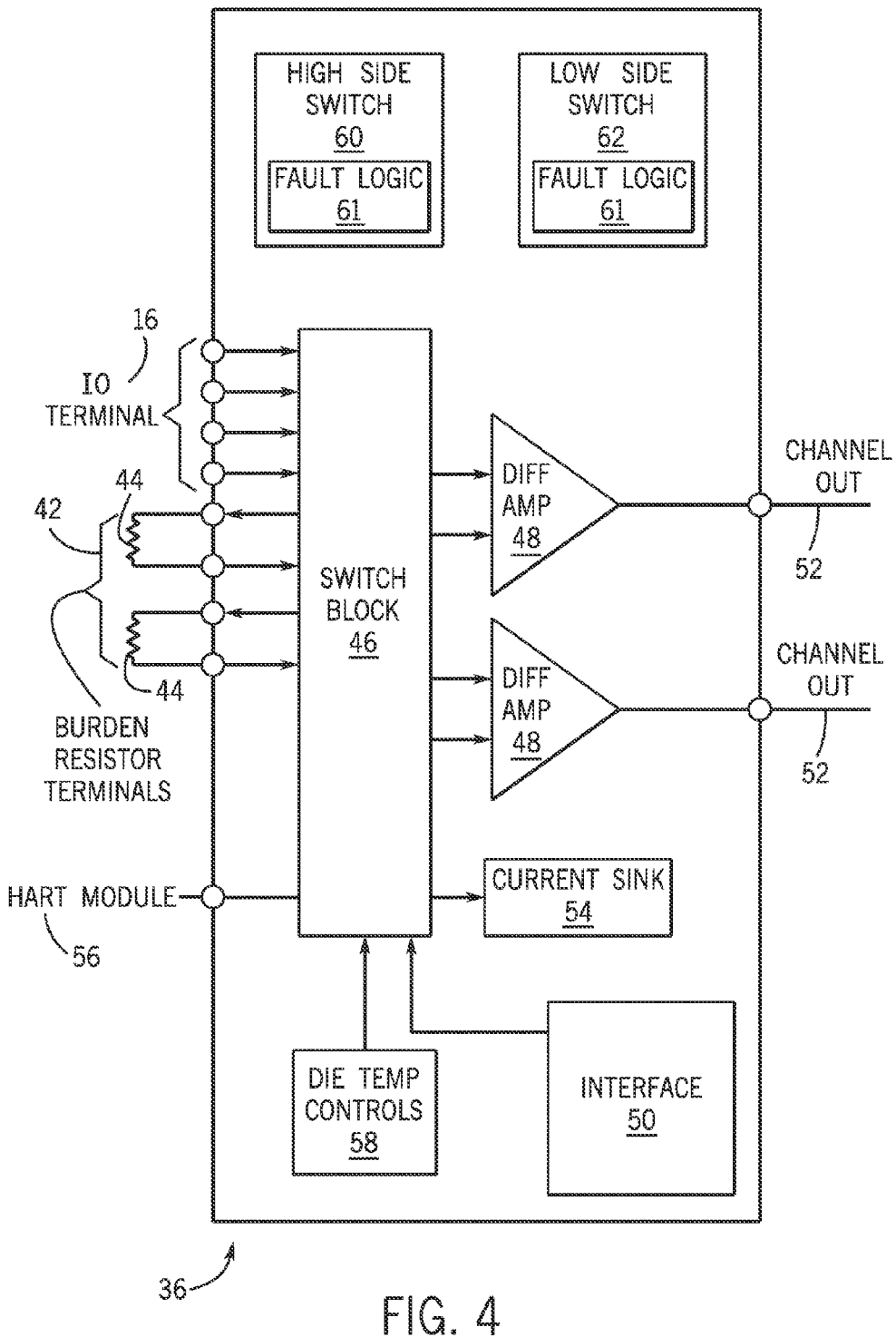
FIG. 4 illustrates a block diagram view of an embodiment of the I/O Gain and Switching of FIG. 3 that may be used with the sensor-controlled system of FIG. 1.

FIG. 4 illustrates an embodiment of the I/O Gain and Switching 36 as an ASIC. The illustrated I/O Gain and Switching 36 includes four IO terminals 16 as well as four burden resistor terminals 42 that couple to burden resistors 44. Moreover, each of the IO terminals 16 and the burden resistor terminals 42 couple to a switch block 46. As discussed below, the switch block 46 includes multiple switches that may be toggled according to the type of sensor connected to the IO terminals 16. After the signals are properly routed in the switch block 46, the signals or a portion of the signal (e.g., sensed voltage) are directed to a respective differential amplifier 48. The differential amplifier 48 is configured to attenuate/amplify the signals according to a selection of a communication method and/or sensor type. The sensor type and/or communication type may be selected using an interface 50 that determines the type of sensor 12 connected to the IO terminals 16. In some embodiments, the sensor type may be selected by a user using an input device (e.g., mouse, keyboard, touchpad, touchscreen, and selector buttons) and displayed on a display. In other embodiments, the I/O Gain and Switching 36 may determine various properties from the sensors, such as sensing the voltage and/or current from the sensors 12 and/or a channel out 52 to determine which communication method should be performed. In such embodiments, the voltage/current ranges may be stored locally or remotely in a device that communicates with the I/O Gain and Switching 36 through the interface 50 such that a sensed voltage and/or current in the range may initiate a communication method that corresponds to the sensor type for the connected sensor 12. Once the signal has been attenuated/amplified to the desired level by the differential amplifiers 48, the signals are sent via the channel out 52.

The interface 50 may include various types of interconnections and methods of communication between the I/O Gain and Switching 36 and an external device such as a processor, a microcontroller, a PLC, a computer, server, other computing device, and/or input device. For example, the interface 50 may include a serial peripheral interface (SPI) bus, an I2C interface, or a controller area network bus (CAN-bus) interface, or other suitable interface. In some embodiments, the interface 50 may be configured to receive data as a variable bit frame, but some embodiments of the interface 50 may be configured to receive data in a fixed bit frame. For example, some embodiments of the interface 50 may be configured to receive 4, 8, 16, 32, 64, or more bit frames. As discussed below, the interface 50 may receive or determine that a sensor type is connected to the IO terminal 16.

In certain embodiments, the interface 50 may select a mode of operation for the switch block 46 that places each of the switches in one of multiple states according to sensor type and/or communication method of a sensor. For example, the interface 50 may alternate the switches in the switch block 56 between an open and closed state. Additionally, in some embodiments, one or more of the modes of operation may have a "don't care" state that ignores the state of one or more ignored switches. In such embodiments, the one or more modes of operation do not include the ignored switch and/or the state of the ignored switch is not significant to the operation of the switch block 46 in the one or more modes of operation. In other words, when the interface 50 causes the toggling of some switches in the switch block 46, the ignored switches may be left to remain in whichever state they were in prior to the toggling. Furthermore, each mode of operation may include a set of respective states for relevant switches. For example, a mode of operation may include closed first, second, and fourth switches; open third and fifth switches; and a "don't care" state for the sixth switch. Another mode may include closed first and fifth switches; open second, fourth, and sixth switches; and a "don't care" state for the third switch.

Moreover, the I/O Gain and Switching 36 may include one or more current sinks 54 for each channel that may be connected to one or more IO terminal 16 when certain sensor types are connected to the IO terminal 16. For example, in some embodiments, the current sink 54 may be coupled to the IO terminal 16 when the respective IO terminal 16 is coupled to an externally wetted contact where current provided by the external power source through the contact is to be regulated to approximately 7.5 mA or less when the contact is closed.

The I/O Gain and Switching 36 may further include a HART module 56 that may receive signals from a HART device/modem. The HART module 56 may also include HART voltage drivers and/or other suitable HART components that enable the I/O Gain and Switching 36 to convert HART signals for processing by the processor 18. Additionally, the I/O Gain and Switching 36 may include die temperature controls 58. In some embodiments, the die temperature controls 58 may include a die temperature sensor and/or logic for disabling one or more switches within the switch block 46 when the sensed temperature surpasses a threshold temperature.

The illustrated embodiment of the I/O Gain and Switching 36 also includes a high side switch 60 and a low side switch 62. Each switch 60, 62 each include fault logic 61 that includes timer settings and/or temperature sensor inputs that may be shared between the switches 60, 62. The fault logic 61 of each switch may determine various faults within the I/O Gain and Switching 36. For example, the fault logic 61 may determine that an output current exceeds a timed threshold for a period beyond a certain period of time. The fault logic 61 may also determine that the output current exceeds a higher threshold for any period of time, where the higher threshold is greater than the timed threshold. In other words the fault logic 61 may track current in relation to two thresholds: a maximum value and a value that is allowed for short durations. Additionally, the fault logic 61 may determine that a switch has been shorted by determining that there is no voltage drop across the switch when the switch should be open. Furthermore, the fault logic 61 may determine that a switch is improperly open by determining that the voltage drop across the switch is too high when the switch should be closed. Additionally, the fault logic 61 may determine that the temperature of the controller logic 36 has exceeded a certain threshold. Additionally, the fault logic 61 may determine over/under voltage. Upon the detection of any such faults, the high side switch 60 and low side switch 62 are may disable the I/O Gain and Switching 36 entirely or disabling various portions of the I/O Gain and Switching.

Figure 5:
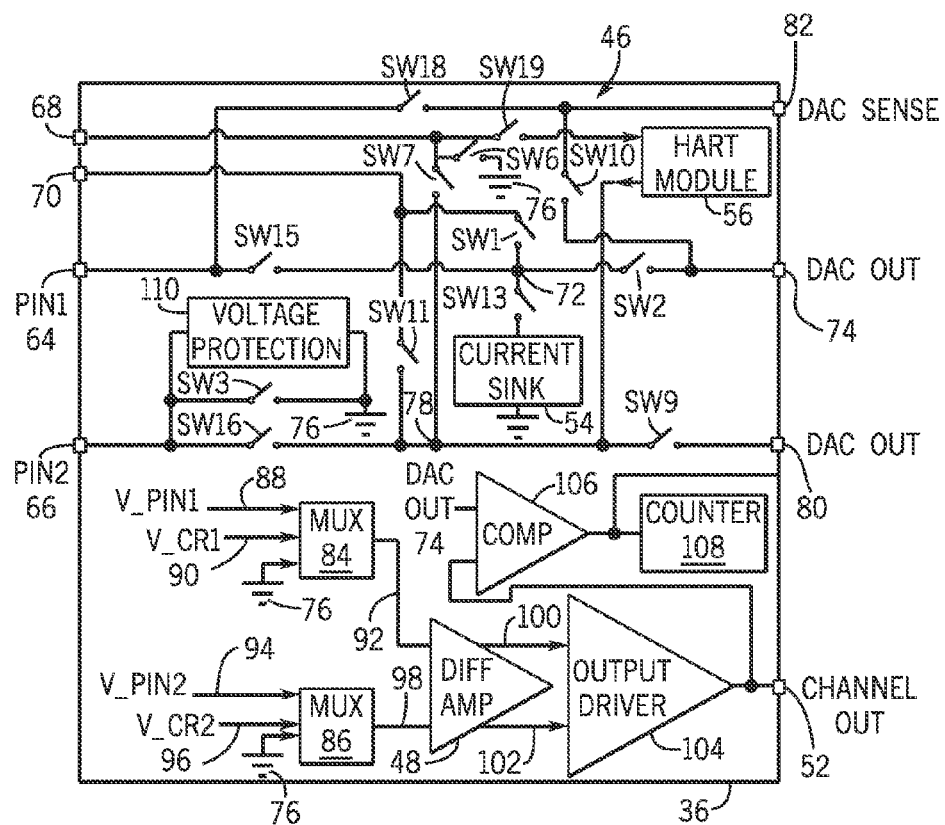
FIG. 5 illustrates a schematic view of an embodiment of the I/O Gain and Switching of FIG. 3 having one channel.

FIG. 5 illustrates an embodiment of the I/O Gain and Switching 36 showing the switch block 46. As illustrated, the I/O Gain and Switching 36 includes a single channel having two IO terminals 16. Specifically, the I/O Gain and Switching 36 includes a Pin1 input terminal 64 and a Pin2 input terminal 66. In the illustrated embodiment, the I/O Gain and Switching 36 also includes two burden resistor terminals 68 and 70 as well as the channel out 52. Additionally, the switch block 46 includes a plurality of switches SW1, SW2, SW3, SW6, SW7, SW9, SW10, SW11, SW13, SW15, SW16, SW18, and SW19. Each of the switches may include different resistance values or a combination of resistance values based on desired circuit properties. For example, in certain embodiments, the switches SW1, SW2, SW7, SW15, and SW16 may include a 10 ohm resistance, the switches SW6, SW9, SW10, SW11, and SW18 may include a 100 ohm resistance, and the switch SW19 may include a 20 ohm resistance. In other embodiments, any switch may include any suitable resistance such as 5, 10, 15, 20, 25, 30, or more ohms. As discussed below, the switches may be grouped into subsets of a plurality of switches with each subset corresponding to a sensor type and/or communication method.

As illustrated, each of the switches may toggle an electrical connection according to a selected communication method and/or sensor type. In other words, the interface 50 may cause a subset of a plurality of switches in the switch block 46 to toggle. For example, SW1 toggles a connection between the burden resistor terminal 70 and a node 72 and minimizes voltage drop on switches used in analog functions. Similarly, SW2 toggles the connection between node 72 and DAC out 74 and minimizes a voltage drop across SW13. Likewise, SW3 toggles the connection between Pin2 input terminal 66 to internal ground 76. Moreover, SW3 allows bidirectional voltage blocking and current flow according to a selected mode and/or user terminal miswiring. SW6 toggles a connection between the burden resistor terminal 68 and internal ground 76. SW6 allows switching upon voltage sensing to protect against high current faults due to incorrect configuration and/or user wiring. SW7 toggles a connection between the burden resistor terminal 68 and a node 78, and SW9 toggles a connection between the node 78 and the DAC out 80. SW10 toggles a connection between a DAC out 74 and a DAC sense 82 that senses a voltage from a respective DAC unit 38 that may receive voltages from the processor 18, an internal power source, and/or other suitable power sources. Additionally, in some embodiments, the interface 50 may be used to select the power that will be sent through the DAC sense 82. SW11 toggles a connection between the node 78 and the burden resistor terminal 70. SW13 toggles a connection between the current sink 54 and the node 72. SW15 toggles a connection between Pin1 input terminal 64 and the node 72. SW16 toggles a connection between the Pin2 input terminal 66 and the node 78. SW18 toggles a connection between the DAC sense 82 and Pin1 input terminal 64. SW19 toggles a connection between HART module 56 and the burden resistor terminal 68.

In addition to the switch block 46, the I/O Gain and Switching 36 includes a Pin1 MUX 84 and a Pin2 MUX 86. The Pin1

MUX 84 receives an input V_pin1 88 that emulates or contains a voltage occurring at the Pin1 input terminal 64. The Pin1 MUX 84 also receives a V_CR1 that emulates or contains a voltage occurring at the burden resistor terminal 70. Additionally, the Pin1 MUX 84 may receive the internal ground 76 connection, a test voltage, and/or HART signals. As can be appreciated, the Pin1 MUX 84 multiplexes each of the received signals and directs a Pin1 multiplexed signal 92 to the differential amplifier 48 that provides a programmable amplification or attenuation. Similar to the Pin1 MUX 84, the Pin2 MUX 86 receives V_Pin2 94 (e.g., voltage of Pin2 input terminal 66), V_CR2 96 (e.g., voltage of burden resistor terminal 68), the internal ground 76, and/or other suitable inputs (e.g., test voltage, HART signals, etc.). The Pin2 MUX 86 then multiplexes the received signals to produce a Pin2 multiplexed signal 98 that is sent to the differential amplifier 48. Additionally, in certain embodiments, the differential amplifier 48 may send an adjusted voltage 100 as well as an inverted adjusted voltage 102 to an output driver 104. In other embodiments, the differential amplifier 48 may send only the adjusted voltage 100 to the output driver 104. Additionally, in some embodiments, the output driver 104 or other circuitry may create an inverse adjusted voltage 102 from the adjusted voltage 100. The output from the output driver 104 is then directed to the channel out 52. Although the illustrated embodiment of channel out 52 only shows one terminal, some embodiments may include a voltage channel out 52 as well as an inverted voltage channel out that inverts the voltage of the voltage channel out 52.

The I/O Gain and Switching 36 may further include a comparator 106 that compares the channel out 52 to the DAC out 74. The comparator 106 may compare a threshold voltage that may be set externally through the DAC sense 82. In other embodiments, the comparator 106 may receive a generated threshold source (e.g., current or voltage source) as an input in place of the DAC out 74. In certain embodiments, the threshold source may be set through the interface 50 in response to a user selection and/or sensed signal properties (e.g., current and/or voltage). Additionally, the I/O Gain and Switching 36 may include a counter 108 that may track the period of time (e.g., clock pulses) that has elapsed while the channel out 52 emits a signal above a threshold when the comparator 106 determines that the channel out 52 surpassed the threshold. For example, if the channel out 52 has a current above a timed threshold (e.g., DAC out 74) for more than 10 clock cycles the counter 108 would count to 10. In certain embodiments, when the counter 108 has surpassed a time limitation value (e.g., 12 clock cycles), the I/O Gain and Switching 36 may disable one or more of the switches to block potential damage to the I/O Gain and Switching 36 or the processor 18. The results of the comparison and/or information stored in the counter 108 may be accessed via a comparator pin PINC1 110. Finally, the I/O Gain and Switching 36 may also include voltage protection 112 that may open switch SW3 when a threshold voltage is sensed across to the voltage protection 112.

Each of the switches may be toggled according to sensor type and/or communication method. For example, if a sensor 12 with an external wetted contact input is connected to Pin1 64 and Pin2 66 input terminals, the interface 50 may toggle switches SW3, SW10, SW13, and SW15 closed to provide appropriate connections for the external wetted contact input. However, if a sensor 12 is connected with an internal wetted contact input is connected to Pin1 64, the interface 50 may toggle switches SW2, SW3, SW10, and SW15 closed. Moreover, if a sensor 12 with a milliamp input is connected to Pin1 64 and Pin2 66 input terminals, switches SW1, SW7, SW15, and SW16 toggled closed (and SW3 may be optionally toggled closed). Likewise, if a sensor 12 with a HART input is connected to Pin1 64 and Pin2 66 input terminals, switches SW1, SW15, SW16, and SW19 may be toggled closed (with SW3 optionally closed). Similarly, if the connected sensor 12 is a thermocouple, all switches may be opened except for switches SW2, SW6, SW7, SW10, SW15, and SW16 that may remain closed during checking. Furthermore, if the connected sensor 12 is an RTD (2 wire), switches SW2, SW3, and SW15 may be toggled closed.

Figure 6:
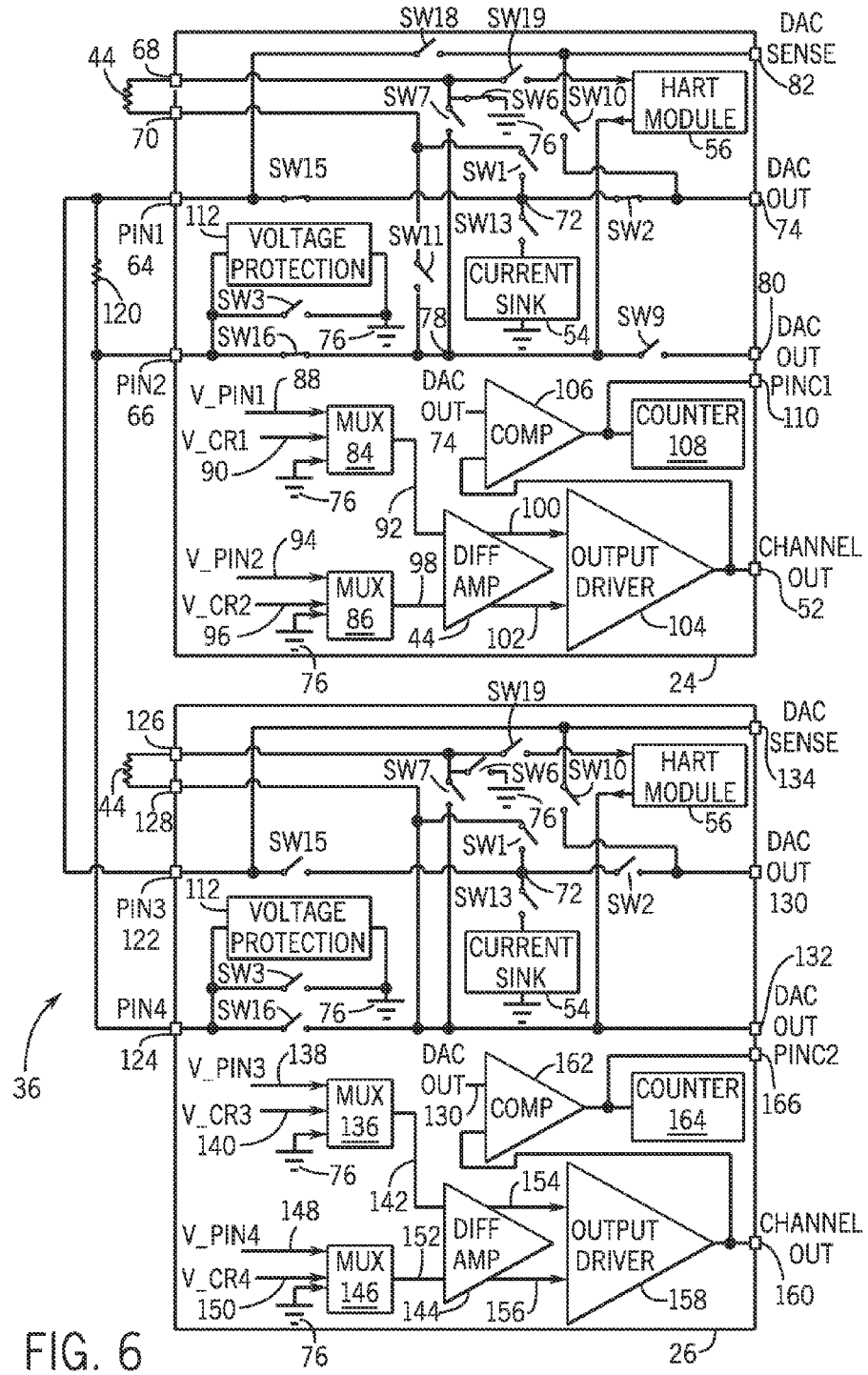
FIG. 6 illustrates a schematic view of an embodiment of the I/O Gain and Switching of FIG. 3 having two channels connected to a 4-wire resistor temperature detector (RTD)

If a sensor 12 includes more than the number of connections for a channel of the I/O Gain and Switching 36, it may be connected to the I/O Gain and Switching 36 across two or more channels thereby connecting one sensor 12 to two or more channels. For example, if an RTD 4-wire is connected as the sensor 12, each of the wires may be coupled to a respective IO terminal 16 of the I/O Gain and Switching 36 even if each channel only includes two IO terminals 16, as illustrated in FIG. 6. FIG. 6 illustrates an embodiment of the I/O Gain and Switching 36 that is coupled to a 4-wire RTD 120 as the sensor 12. In certain embodiments, the 4-wire RTD may be coupled across two channels each incorporating two IO terminals 16. Specifically, the 4-wire RTD 120 may be coupled to the first channel 24 via Pin1 64 and Pin2 66 input terminals, and the 4-wire RTD 120 coupled to the second channel 26 via Pin3 122 and Pin4 124 input terminals. In other embodiments, a single channel may incorporate 1, 3, 4, or more IO terminals 16.

In certain embodiments, the second channel 26 may duplicate the first channel 24. In other embodiments, the implementation of the second channel 26 may vary from the implementation of the first channel 24. For example, the second channel 26 may omit various switches present in the first channel 24, such as the switches SW9 and SW11. As illustrated, the second channel 24 includes the Pin3 122 and Pin4 124 input terminals as well as the burden resistor terminals 126 and 128 that are similar to the burden resistor terminals 68 and 70 in the first channel 24. Additionally, the second channel 26 includes DAC outs 130 and 132 that correspond to respective DAC outs 74 and 80 in the first channel 24. Additionally, the second channel 26 includes a DAC sense 134 that is similar to the DAC sense 82 in the first channel 24.

The second channel 26 also includes a Pin3 MUX 136 that receives voltages V_Pin3 138 (voltage of Pin3 122 input terminal) and V_CR3 140 (voltage of burden resistor terminal 128) as well as the internal ground 76. Additionally, certain embodiments of the Pin3 MUX 136 may receive test voltages, HART inputs, or other suitable signals. As can be appreciated, the Pin 1 MUX 84 multiplexes each of the received signals and directs a Pin3 multiplexed signal 142 to the differential amplifier 144 that provides a programmable amplification or attenuation. Similar to the Pin3 MUX 136, a Pin4 MUX 146 receives V_Pin4 148 (e.g., voltage of Pin4 input terminal 124), V_CR4 150 (e.g., voltage of burden resistor terminal 126), the internal ground 76, and/or other suitable inputs (e.g., test voltage, HART signals, etc.). The Pin4 MUX 146 then multiplexes the received signals to produce a Pin4 multiplexed signal 152 that is sent to the differential amplifier 144. Additionally, in certain embodiments, the differential amplifier 144 may send an adjusted voltage 154 as well as an inverted adjusted voltage 156 to an output driver 158. In other embodiments, the differential amplifier 144 may send only the adjusted voltage 154 to the output driver 158. Additionally, in some embodiments, the output driver 158 or other circuitry may create an inverse adjusted voltage 156 from the adjusted voltage 154. The output from the output driver 158 is then directed to a channel out 160. Although the illustrated embodiment of channel out 160 only shows one terminal, some embodiments may include a voltage channel out 160 as well as an inverted voltage channel out that inverts the voltage of the voltage channel out 160.

The second channel 26 may further include a comparator 162 that compares the channel out 160 to the DAC out 130. The comparator 162 may compare a threshold voltage that may be set externally through the DAC sense 134. In other embodiments, the comparator 162 may receive a generated threshold source as an input in place of the DAC out 130. In certain embodiments, the threshold source may be set through the interface 50 in response to a user selection and/or sensed signal properties (e.g., current and/or voltage). Additionally, the second channel 26 may include a counter 164 that may track the period of time (e.g., clock pulses) that has elapsed while the channel out 160 emits a signal above a threshold when the comparator 162 determines that the channel out 160 is above the threshold. For example, if the channel out 160 has a current above a timed threshold (e.g., DAC out 130) for more than 10 clock cycles the counter 164 would count to 10. In certain embodiments, when the counter 164 has surpassed a time limitation value (e.g., 12 clock cycles), the I/O Gain and Switching 36 may disable one or more of the switches to block potential damage to the I/O Gain and Switching 36 and/or the processor 18. The results of the comparison and/or information stored in the counter 108 may be accessed via a comparator pin PINC2 166.

As may be appreciated, the I/O Gain and Switching 36 uses the first channel 24 to provide current through the 4-wire RTD 120 and allowing the return path to sense the amount of current to verify the setting of the DAC 38. The I/O Gain and Switching 36 also uses the second channel 26 to sense voltage across the RTD. As illustrated, to perform these functions, the first channel 24 toggles switches SW 2, SW6, SW15, and SW16 close, and the second channel 26 toggles all switches open.

Figure 7:
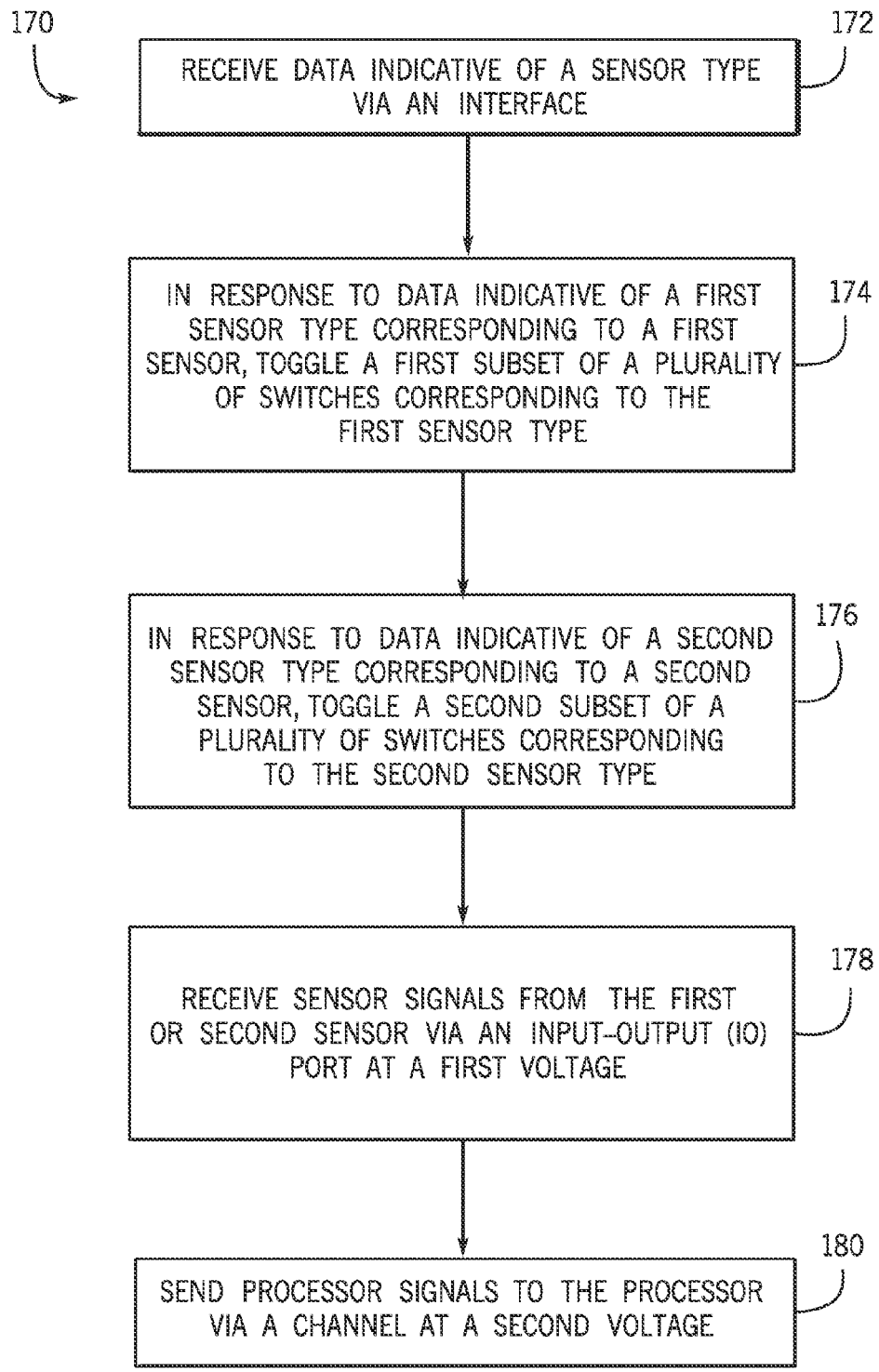
FIG. 7 illustrates a flow diagram view of an embodiment of a method for communicating between the sensor and the processor of FIG. 1

FIG. 7 is a flow diagram view of an embodiment of a method 170 for communicating between a sensor and a processor. The method 170 includes receiving data indicative of a sensor type via an interface (block 172). In some embodiments, the data may include a selection from a user, a state machine selection, an automatic determination from a sensed voltage of the sensor, an automatic determination from a sensed current of the sensor, and/or other suitable data indicative of a sensor type. In response to data indicative of a first sensor type corresponding to a first sensor, the interface toggles a first subset of a plurality of switches corresponding to the first sensor type (block 174). The subset of the plurality of switches arranges electrical connections within a switch block to enable to sensor to properly communicate with the processor. Similarly, in response to data indicative of a second sensor type corresponding to a second sensor, the interface toggles a second subset of a plurality of switches corresponding to the second sensor type (block 176). Accordingly, the interface switches electrical connections within a switch block to ensure that sensors of various types may be connected to an IO port and establish a proper electrical connection between the various sensor types to the processor through a single IO port. After the interface arranges the switch block in the proper configuration, the switch block receives a sensor signal from the sensor (of any compatible type) at a first voltage (block 178). Through the arrangement of the electrical network in the switch block, the sensor signals are converted to processor signals that are sent to the processor at a second voltage (block 180). In some embodiments, the processor signals may be sent through additional electrical devices such as ADC, DAC, filters, and/or other suitable signal conditioning devices. The processor receives the processor signals and may use the signals to perform certain tasks (e.g., manage operation of a turbine system).

Technical effects of the disclosure include a versatile front side conversion unit to provide a universal IO point between a sensor 12 and a processor 18 that may be used in a variety of sensor-controlled systems 10. By providing a front side conversion unit that enables the use of various sensor types, the applicability of the front side conversion unit enables one controller cabinet 14 to be used in a variety of applications each demanding various types of sensors. As can be appreciated, by providing a single universal IO point conversion unit design, the design of the controller cabinet 14 may be used in various sensor-controlled systems 10 without requiring a redesign for each sensor-controlled system 10. By providing a universal controller cabinet 14, the production and design costs of the controller cabinet 14 may be reduced by reducing/eliminating the redesign process of the controller cabinet 14 and reducing/eliminating retooling production of newly designed controller cabinets 14. Additionally, by providing universal IO terminals and/or channels, many different sensor types may be interchangeably connected to each IO terminal without including wasted terminals by reducing the number of terminals and/or channels used to enable connection of multiple sensor types.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a controller configured to enable communication between one or more sensors and a processor, wherein the controller comprises:
a plurality of input-output (IO) ports configured to couple to the one or more sensors, wherein each of the IO ports is configured to couple to a plurality of sensor types, wherein each IO port is configured to couple to a first sensor of the one or more sensors and a second sensor or the one or more sensors, the first sensor comprises a first sensor type of the plurality of sensor types, and the second sensor comprises a second sensor type of the plurality of sensor types, and the first sensor type is different than the second sensor type;
an interface configured to receive data indicative of the first or second sensor type and select a first mode if the first sensor type is selected and to select a second mode if the second sensor type is selected; and
a switch block communicatively coupled to the interface, wherein the switch block comprises a plurality of switches, wherein each switch of the plurality of switches is configured to operate in a plurality of states, each state in the plurality of states is configured to couple one or more of the IO ports to the processor, and the plurality of switches operates according to a first set of respective states when the first mode is selected by the interface and a second set of respective states when the second mode is selected by the interface.

2. The system of claim 1, wherein the plurality of states comprises:
an open state;
a closed state; and
a "don't care" state.

3. The system of claim 1, wherein the controller comprises a programmable logic controller or a distributed control system interface configured to control a power station.

4. The system of claim 1, wherein each of the plurality of modes corresponds to a communication method of a plurality of communication methods.

5. The system of claim 3, wherein each sensor type of the plurality of sensor types corresponds to a respective communication method of the plurality of communication methods.

6. The system of claim 4, wherein the plurality of sensor types comprises thermocouple devices, resistance temperature detector devices, and highway addressable remote transducer (HART) devices.

7. The system of claim 1, wherein one or more inputs to the system comprise currents of approximately 4 mA to 20 mA.

8. The system of claim 1, wherein one or more inputs to the system comprise voltages of approximately 30 V or below.

9. The system of claim 1, comprising fault logic configured to determine that a disconnection has occurred in the controller, the one or more sensors, or a communication path therebetween.

10. The system of claim 1, wherein the switch block comprises:
a current block of switches configured to toggle connections between a current source and a respective IO port of the plurality of IO ports; and
a voltage block of switches configured to toggle connections between a voltage driver and a respective IO port of the plurality of IO ports.

11. The system of claim 1, comprising at least one differential amplifier configured to convert signals from the switch block to a level used by an interface of the processor.

12. An integrated circuit configured to provide signal conversion from one or more sensors to a processor, comprising:
an input-output (IO) port configured to couple to a first sensor and a second sensor, wherein the first sensor is configured to couple to the IO port using a first communication method and the second sensor is configured to couple to the IO port using a second communication method;
an interface configured to receive data indicative of the first communication method or the second communication method; and
a switch block communicatively coupled to the interface, wherein the switch block comprises a plurality of switches, wherein the interface is configured to toggle a first subset of the plurality of switches in the switch block upon receiving data indicative of the first communication method and configured to toggle a second subset of the plurality of switches upon receiving data indicative of the second communication method, wherein the first subset is configured to couple the first sensor to the processor and the second subset is configured to couple the second sensor to the processor.

13. The integrated circuit of claim 12, comprising:
at least one voltage driver;
at least one current source; and
at least one current sink.

14. The integrated circuit of claim 13, wherein the at least one voltage driver comprises a programmable voltage driver, the at least one current source comprises a programmable current source, and the at least one current sink comprises a programmable current sink.

15. The integrated circuit of claim 13, comprising fault logic configured to determine die temperature of the integrated circuit and disable the at least one voltage driver or the at least one current source when the die temperature exceeds a threshold temperature.

16. The integrated circuit of claim 12, wherein the interface comprises a serial peripheral interface (SPI) bus, an $I^2C$ interface, SMBus interface, or CAN-bus interface.

17. The integrated circuit of claim 16, wherein the interface is configured to transfer a 16-bit data frame.

18. The integrated circuit of claim 12, wherein the interface is configured to receive a selection from a state machine as the data indicative of the first communication method in response to an expected signal property determined at an output of the integrated circuit.

19. A method for communicating between a sensor and a processor, comprising:
receiving data indicative of a sensor type via an interface;
in response to data indicative of a first sensor type corresponding to a first sensor, toggling a first subset of a plurality of switches corresponding to the first sensor type, wherein the first subset of the plurality of switches correspond to the first sensor type, and the toggling of the first subset of the plurality of switches is based at least in part on the data indicative of the first sensor type;
in response to data indicative of a second sensor type corresponding to a second sensor, toggling a second subset of a plurality of switches corresponding to the second sensor type, wherein the second subset of the plurality of switches correspond to the second sensor type, and the toggling of the second subset of the plurality of switches is based at least in part on the data indicative of the second sensor type;
receiving sensor signals from the first or second sensor via an input-output (IO) port at a first voltage; and
sending processor signals to the processor via a channel at a second voltage.

20. The method of claim 17, comprising:
receiving the sensor signals from the first or second sensor via the IO port at a first current;
determining that the first current corresponds to the first sensor type;
in response to the determination, selecting the first sensor type, wherein the selection of the first sensor type causes the first subset of the plurality of switches to be switched; and
sending processor signals to the processor via the channel at a second current.

* * * * *